US011507080B2

(12) United States Patent
Sahay et al.

(10) Patent No.: US 11,507,080 B2
(45) Date of Patent: Nov. 22, 2022

(54) PORTABLE AIRCRAFT CONTROLLER DEVICES AND SYSTEMS

(71) Applicant: SIKORSKY AIRCRAFT CORPORATION, Stratford, CT (US)

(72) Inventors: Prateek Sahay, Acton, MA (US); Margaret MacIsaac Lampazzi, Oxford, CT (US); Sacha Duff, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 273 days.

(21) Appl. No.: 16/648,017

(22) PCT Filed: Sep. 19, 2017

(86) PCT No.: PCT/US2017/052226
§ 371 (c)(1),
(2) Date: Mar. 17, 2020

(87) PCT Pub. No.: WO2019/059889
PCT Pub. Date: Mar. 28, 2019

(65) Prior Publication Data
US 2020/0264599 A1   Aug. 20, 2020

(51) Int. Cl.
G05D 1/00       (2006.01)
B64C 39/02      (2006.01)
(Continued)

(52) U.S. Cl.
CPC ......... G05D 1/0016 (2013.01); B64C 39/024 (2013.01); B64D 43/00 (2013.01);
(Continued)

(58) Field of Classification Search
CPC .. G05D 1/0016; G05D 1/0022; B64C 39/024; B64C 2201/12; B64C 2201/146; B64D 43/00; B64D 45/00; G08G 5/0004
See application file for complete search history.

(56) References Cited

U.S. PATENT DOCUMENTS

2008/0154446 A1   6/2008  Rui et al.
2010/0106870 A1   4/2010  Saugnac
(Continued)

OTHER PUBLICATIONS

Patel, IP-Based Connection Between Mobile Phones, 2014 International Conference on Computer Communication and Informatices (ICCCI-2014, Jan. 3-4, 2014, Filed name—IP-based connection between mobile phones (Year: 2014).*

(Continued)

Primary Examiner — Anne Marie Antonucci
Assistant Examiner — Patrick M Brady
(74) Attorney, Agent, or Firm — Foley & Lardner LLP

(57) ABSTRACT

A portable computerized device for an aircraft control system includes an input system for inputting commands, a device display for displaying information on the computerized device, a processor, a wireless communication module, and a non-transitory computer readable medium comprising computer executable instructions, the computer executable instructions configured to cause the processor to perform a method. The method can include detecting whether the portable computerized device is in a cockpit state such that the portable computerized device is in and/or docked to an aircraft cockpit or if the portable computerized device is in a remote state such that the portable computerized device is not in an aircraft cockpit or is not docked to an aircraft cockpit. If the portable computerized device is determined to be in a remote state, the method includes operating the remote device in a remote mode. If the portable computerized device is determined to be in a cockpit state, the method includes operating the device in a local mode.

18 Claims, 4 Drawing Sheets

(51) Int. Cl.
    *B64D 43/00*     (2006.01)
    *B64D 45/00*     (2006.01)
    *G08G 5/00*     (2006.01)

(52) U.S. Cl.
    CPC ........... *B64D 45/00* (2013.01); *G05D 1/0022* (2013.01); *G08G 5/0004* (2013.01); *B64C 2201/12* (2013.01); *B64C 2201/146* (2013.01)

(56) References Cited

U.S. PATENT DOCUMENTS

| | | | |
|---|---|---|---|
| 2012/0109424 A1 | 5/2012 | Fervel et al. | |
| 2012/0265372 A1* | 10/2012 | Hedrick | H04L 67/14 701/3 |
| 2015/0120097 A1* | 4/2015 | Hathaway | B64D 47/08 701/14 |
| 2016/0200421 A1* | 7/2016 | Morrison | B64C 27/08 244/17.23 |
| 2017/0233093 A1 | 8/2017 | Sanders | |
| 2017/0251501 A1* | 8/2017 | Batsakes | G06F 3/1454 |
| 2018/0373404 A1* | 12/2018 | Sivaratri | G08G 5/0052 |
| 2020/0027378 A1* | 1/2020 | Castet | B64D 43/00 |

OTHER PUBLICATIONS

International Search Report for Application No. PCT/US2017/052226 dated Jul. 18, 2018, 4 pages.
Written Opinion for International Application No. PCT/US2017/052226 dated Jul. 18, 2018, 11 pages.

\* cited by examiner

PORTABLE AIRCRAFT CONTROLLER DEVICES AND SYSTEMS

STATEMENT OF GOVERNMENT RIGHTS

This invention was made with government support under contract no. HR0011-15-9-0004 awarded by the Defense Advanced Research Projects Agency (DARPA). The government has certain rights in the invention.

CROSS REFERENCE TO RELATED APPLICATIONS

This application is a National Stage application of PCT/US2017/052226, filed Sep. 19, 2017, which is incorporated by reference in its entirety herein.

BACKGROUND

1. Field

The present disclosure relates to aircraft systems, more specifically to portable aircraft controller devices and systems.

2. Description of Related Art

Certain aircraft systems are integrating more and more autonomous features into aircraft. There is a lack of human control integration for such systems, and usually a pilot of a semi-autonomous aircraft has multiple devices and platforms that must be controlled in different flight phases and/or on the ground.

Such conventional methods and systems have generally been considered satisfactory for their intended purpose. However, there is still a need in the art for improved aircraft controller systems. The present disclosure provides a solution for this need.

SUMMARY

A portable computerized device for an aircraft control system includes an input system for inputting commands, a device display for displaying information on the computerized device, a processor, a wireless communication module, and a non-transitory computer readable medium comprising computer executable instructions, the computer executable instructions configured to cause the processor to perform a method. The method can include detecting whether the portable computerized device is in a cockpit state such that the portable computerized device is in and/or docked to an aircraft cockpit or if the portable computerized device is in a remote state such that the portable computerized device is not in an aircraft cockpit or is not docked to an aircraft cockpit. If the portable computerized device is determined to be in a remote state, the method includes operating the remote device in a remote mode. If the portable computerized device is determined to be in a cockpit state, the method includes operating the device in a local mode.

In the remote mode, the method can include wirelessly communicating with the aircraft via the wireless communication module directly or indirectly. In the remote mode, the method can include communicating with the aircraft indirectly through ground based or satellite based communication devices.

The method can include providing a remote mode generated user interface (GUI) in the remote state. The method can include providing a local mode generated user interface (GUI). In certain embodiments, the remote mode GUI and the local mode GUI are different in at least one function.

The portable computerized device can be configured to remotely communicate with an aircraft computer to exclusively control at least one system of the aircraft in the remote mode. The portable computerized device can be configured to directly locally communicate with an aircraft computer in the local mode to act as a proxy controller of the aircraft. In certain embodiments, in the local mode, information from the portable computerized device can be displayed on a primary display in the cockpit of the aircraft and vice-versa.

In the local mode, the portable computerized device can be docked to a device mount in the cockpit. In certain embodiments, in the local mode, the device can locally communicate with the aircraft computer via a hard wire connection. In the local mode, the portable computerized device can be positioned in a heads-up position in the cockpit.

In accordance with at least one aspect of this disclosure, a non-transitory computer readable medium comprising computer executable instructions, the computer executable instructions configured to cause the processor of a portable computerized device to perform a method and/or an suitable portion thereof disclosed herein. For example, the method can include remotely communicating with an aircraft computer to exclusively control at least one system of the aircraft in the remote mode. In certain embodiments, the method can include directly locally communicating with an aircraft computer in the local mode to act as a proxy controller of the aircraft.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
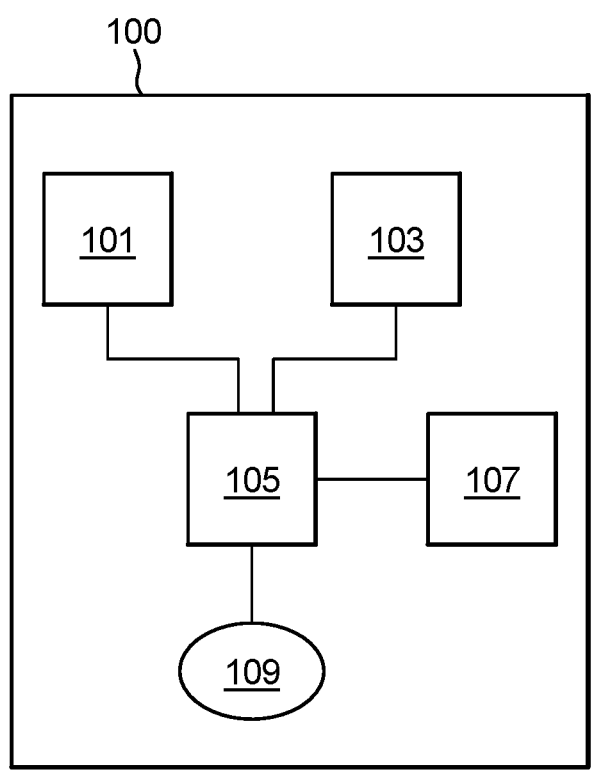
FIG. 1 is a schematic view of an embodiment of a portable computerized device in accordance with this disclosure.
Figure 2:
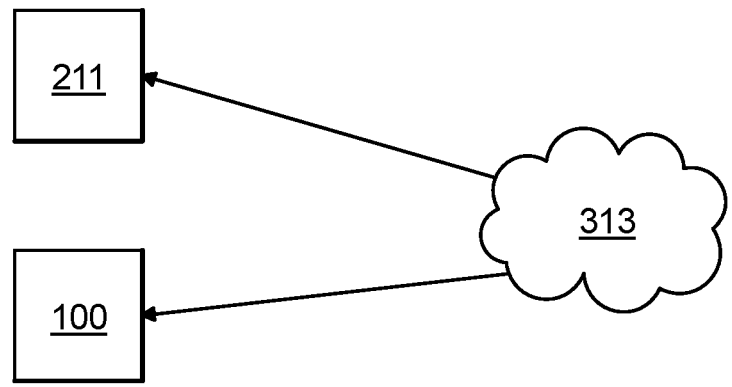
FIG. 2 is a schematic view of an embodiment of a device wirelessly interacting with an aircraft computer indirectly.
Figure 3:
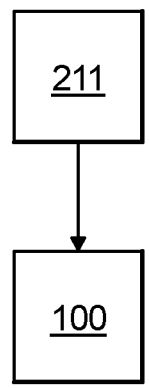
FIG. 3 is a schematic view of an embodiment of a device wirelessly interacting with or hardwired to an aircraft computer directly.
Figure 4:
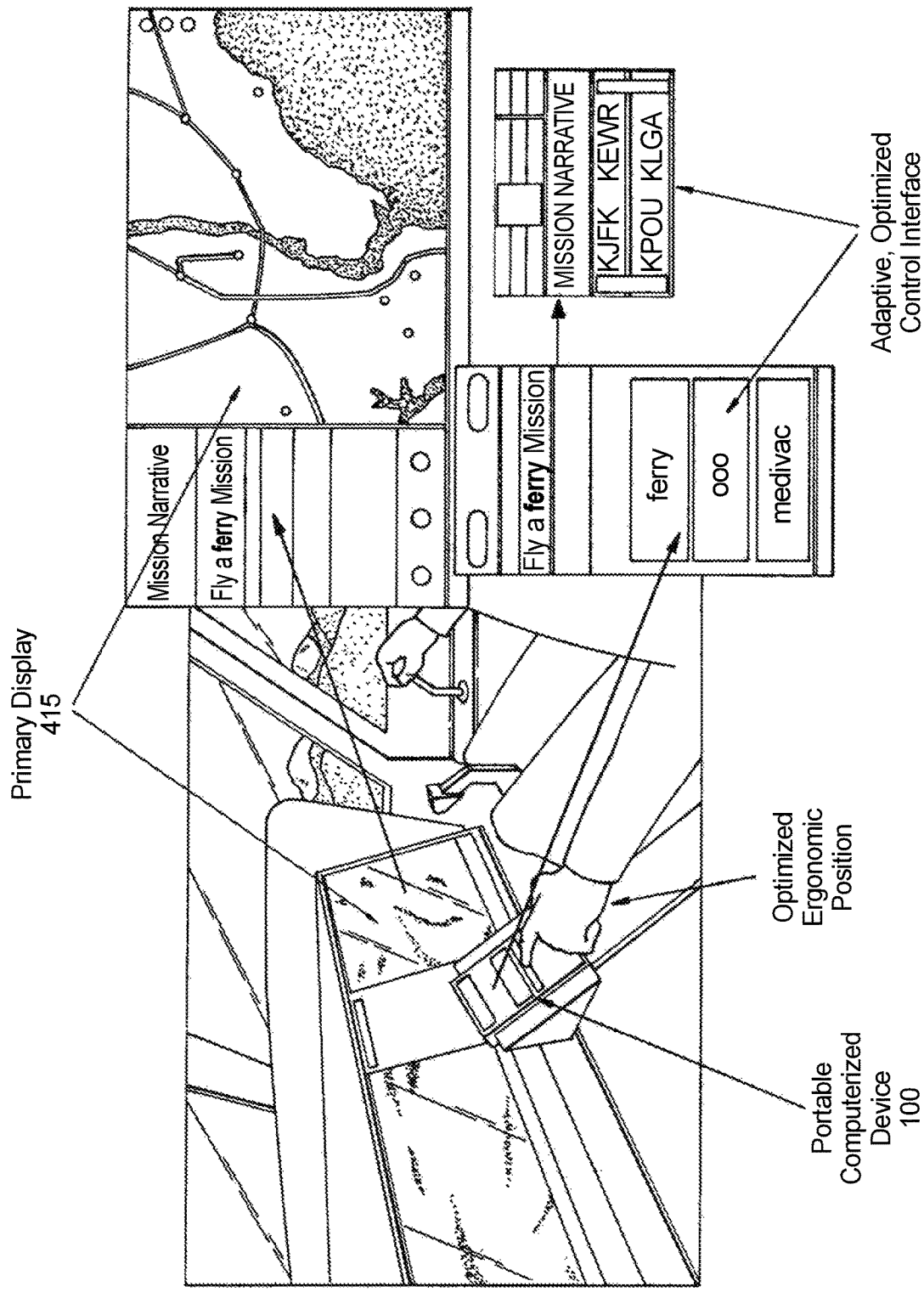
FIG. 4 is a schematic view of a cockpit environment showing an embodiment of the device docked in an aircraft and sharing data with a primary display of the aircraft, wherein at least a portion of a local mode and/or remote mode GUI is shown.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1 and is designated generally by reference character 100. Other embodiments and/or aspects of this disclosure are shown in FIGS. 2-4. The systems and methods described herein can allow a seamless flight planning and/or control scheme for a pilot, reducing pilot workload and enhancing cockpit management and safety.

Referring to FIG. 1, a portable computerized device 100 for an aircraft control system (e.g., as shown in FIG. 2) can include an input system 101 for inputting commands (e.g., at least one of a touch screen or a keyboard for example). The device 100 can include a device display 103 (e.g., an LED display with a touchscreen input) for displaying information on the computerized device 100.

The device 100 can also include a processor 105, a wireless communication module 107, and a non-transitory computer readable medium 109 (e.g., any suitable storage device). The device 100 can include any other suitable hardware components as appreciated by those having ordinary skill in the art.

The non-transitory computer readable medium 109 can include computer executable instructions (e.g., any suitable computer code/language), the computer executable instructions configured to cause the processor to perform a method. The method can include detecting whether the portable computerized device 100 is in a cockpit state such that the portable computerized device 100 is in and/or docked to an aircraft cockpit or if the portable computerized device 100 is in a remote state such that the portable computerized device 100 is not in an aircraft cockpit and/or is not docked to an aircraft cockpit. If the portable computerized device 100 is determined to be in a remote state, the method includes operating the remote device in a remote mode. If the portable computerized device 100 is determined to be in a cockpit state, the method includes operating the device in a local mode.

Referring to FIGS. 2 and 3, the portable computerized device 100 can be configured to remotely communicate with an aircraft computer 211 to control, e.g., exlusively, at least one system of the aircraft (e.g., a powerplant system and/or a navigation system and/or control surfaces) in the remote mode. For example, in the remote mode (e.g., whether on ground or in the cockpit), the method can include wirelessly communicating with an aircraft computer 211 via the wireless communication module directly (e.g., via Bluetooth, wifi, or any other suitable connection as shown in FIG. 2) or indirectly.

In certain embodiments, the device 100 can communicate in the remote mode with the aircraft computer 211 indirectly. For example, the method can include indirectly communicating with the aircraft indirectly through ground based or satellite based communication devices 313 (e.g., any suitable network is contemplated herein, e.g., the internet) as shown in FIG. 3.

The aircraft computer can include an HPC (high performance computer) and/or an AMM (autonomous mission manager) as a part of the HPC. In certain embodiments, the AMM can receive data from the device 100 and can be the interface between the device 100 and the rest of the aircraft.

The method can include providing a remote mode generated user interface (GUI) in the remote state. For example, the remote mode GUI can be configured for ground based preflight preparation and flight planning (e.g., with one or more widgets, apps, icons, or the like displayed that are for use in preflight preparation). For example, the remote mode GUI can present navigation software to the user to plot a desired route and/or to select a mission type (e.g., ferry mode, cargo mode, medivac mode, etc.).

The remote mode GUI can include and execute widget configured to cause the aircraft computer 211 to execute a planned flight autonomously and/or to dynamically update the uploaded route based on one or more flight conditions. Wireless inflight control widgets can be provided in the remote mode in certain embodiments to manually control one or more aircraft systems. The aircraft computer 211 and/or the device 100 can be a smart system configured to adaptively modify aircraft controls and/or flight routes and/or flight characteristics as a result of one or more in flight factors and/or selected flight modes (e.g., as presented above).

The method can include providing a local mode generated user interface (GUI). In certain embodiments, the remote mode GUI and the local mode GUI are different in at least one function. For example, the local mode GUI can include more accessible aircraft control widgets, apps, icons, or the like for use in assisting cockpit management (e.g., engine controls, navigation controls, flight mode selection, etc.). It is contemplated however that the remote mode and the local mode can include similar or the same functionalities.

In the local mode, the portable computerized device 100 can be configured to directly locally communicate with an aircraft computer 100 in the local mode to act as a proxy controller of the aircraft. For example, as shown in FIG. 4, in certain embodiments, in the local mode, information from the portable computerized device 100 can be displayed on at least one primary display 415 in the cockpit of the aircraft and vice-versa. In certain embodiments, any suitable information from either the device 100 or the aircraft computer 211 can be moved and/or displayed on the other. For example, when the device 100 is docked, it can look for/receive information on other displays it is now connected and then adjust what is displayed on each based on the number, type, and/or size of each display.

Also as shown in FIG. 4, the local mode GUI can include a step by step user query in the form of an adaptive, optimized control interface. As shown, the user can select a mode (also referred to as a mission) and then be taken to a navigational screen where one or more destinations and/or waypoints can be entered and/or displayed from existing flight data (e.g., from a flight plan prepared on the ground). The selections and/or a map can be displayed on the primary display.

As shown, in the local mode, the portable computerized device 100 can be docked to a device mount 417 in the cockpit. In certain embodiments, in the local mode, the device can locally communicate with the aircraft computer 211 via a hard wire connection. In certain embodiments, upon docking, the device 100 can recognize (e.g., using a physical sensor or any other suitable mechanism) that it is docked and switch from remote mode to local mode.

It is contemplated that the device 100 need not be physically docked to switch to local mode. For example, it is contemplated that the device 100 can determine its location and, if within the cockpit at all (or in any suitable location in the cockpit), the device 100 can switch to local mode. For example, the device 100 can be in communication with the aircraft computer 211 via a suitable network (e.g., a satellite system) in the remote mode, then determine that it is within a predetermined local location (e.g., within the cockpit), then switch to local mode and establish a direct wireless communication with the aircraft computer 211.

Figure 5:
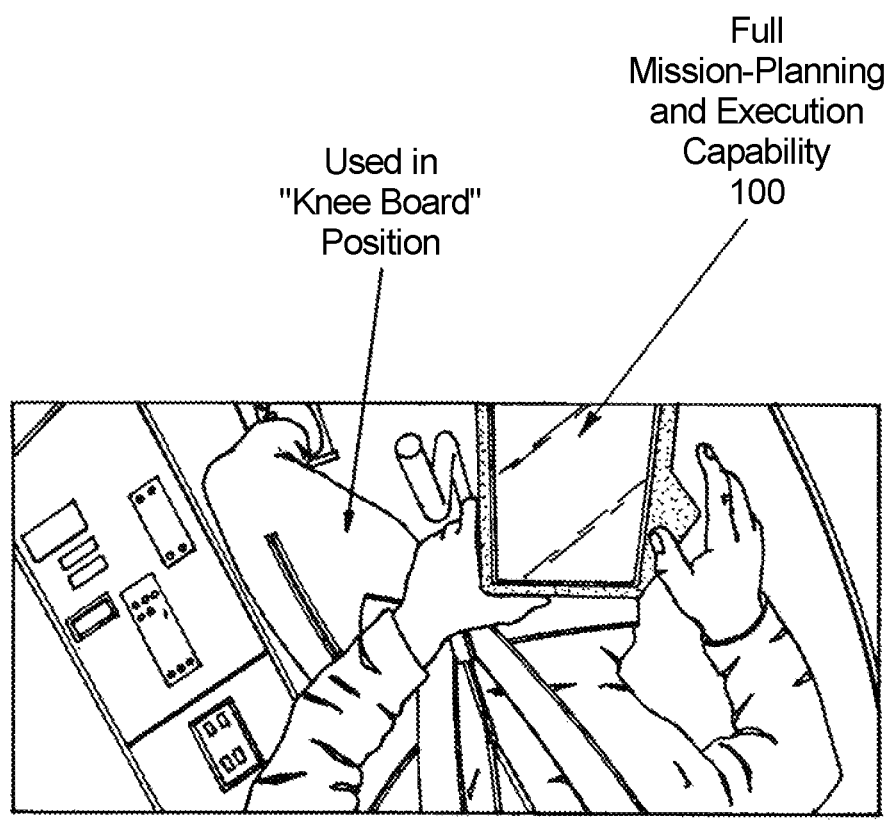
FIG. 5 is a schematic view of a cockpit environment showing an embodiment of the device in a portable position, e.g., in a kneeboard position.

The mounting location of the device 100 can be in an ergonomic location to keep a pilot's focus forward (e.g., to avoid head down time and/or ensure heads-up usage). For example, in the local mode, the portable computerized device can be positioned in a heads-up position in the cockpit. However, it is contemplated the pilot can use the device 100 in remote mode or in local mode in a kneeboard position, for example, as shown in FIG. 5.

In accordance with at least one aspect of this disclosure, a non-transitory computer readable medium comprising computer executable instructions, the computer executable instructions configured to cause the processor of a portable computerized device to perform a method and/or an suitable portion thereof disclosed herein.

Embodiments of a device 100 (which can be configured as a touch screen tablet) can dynamically present optimally designed control interfaces that are mission context and task dependent. Embodiments of the device 100 can be used in conjunction with a primary display that depicts data and visualizations about the current and future states of the aircraft and mission, for example. The primary display and device 100 can be part of the same system, and therefore inputs made to the device 100 can be reflected on the primary display, for example. This configuration can bring the control surface into the operator's required reach envelope, closer to an optimal viewing position, and can allow neutral arm and neck position during use.

In certain embodiments, on the ground away from aircraft, the user can be presented with a navigational application to create a mission (e.g., waypoints, aircraft behaviors, checking a 3D view). The user can also be enabled to fly the aircraft remotely (e.g., via autonomous execution or via manual flight control such as widgets presented on the screen or one or more physical controls on the device).

In certain embodiments, when plugged in to the aircraft, the device 100 can switch from a combo display (e.g., indicators, maps, and control items combined) to enlarged control items on the device (which can be in an ergonomic position) and indicator/maps to onboard primary display. In certain embodiments, a user can use inputs to the device 100 to pan and zoom on primary display.

In certain embodiments, application tabs to display on primary display can include one or more of maps, dials, health indicators, and/or sensors. It is contemplated that any suitable portion can be displayed on any display in the cockpit (e.g., maps for pilot, sensors or indicators for copilot).

As described above, certain embodiments can include a mission inquiry process such as starting with an prompt "I want to fly [insert type (e.g., ferry, medivac)] mission," with acceptable selections available on the device. As items are chosen, new prompts and possible inputs fields/buttons can arise to help plan flight (e.g., "where is patient for medivac?", "what speed?").

After at least one waypoint is programmed in, the user may be allowed to activate an execute button/widget. In certain embodiments, the plan can be edited, canceled, or otherwise modified continuously and/or seamlessly. In certain embodiments, the device 100 can allow control of certain aircraft parameters (e.g., speed) only when docked in the aircraft.

Embodiments include a smart system that can interact with an aircraft computer (and/or including any related systems associated with the aircraft computer). For example, embodiments can automatically create an entire new flight plan based on hazards that will exist after a condition (e.g., an engine failure, a visibility restriction, a terrain obstruction) that may not have existed before.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Embodiments can facilitate ergonomic positioning for the operator, allow the operator to remain "head-up" while gazing at the primary display and outside rather than fixate on a small tablet interface to monitor task execution, optimize the design of the controls to minimize search time and facilitate efficient interaction, and enhance flexibility of operations (e.g., a tablet can be used for full mission planning outside the cockpit then used as proxy controller for mission execution), for example. Embodiments enable an operator to interact with a highly autonomous system in a flexible, efficient manner, e.g., via a touch screen interface, while accommodating an optimal reach envelope and minimizing time spent "head down." Embodiments of a portable device can be used as a proxy controller that, when undocked, enables an operator to conduct full mission planning or execution from inside or outside of the cockpit, and when docked in a cockpit, e.g., equipped with at least one additional main display, can be the dynamic control interface for the system.

By way of example, aspects of the invention can be used in coaxial helicopters, on tail rotors, or wings or propeller blades on fixed or tilt wing aircraft.

The methods and systems of the present disclosure, as described above and shown in the drawings, provide for aircraft control systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A portable computerized device for an aircraft control system, comprising:
   an input system for inputting commands;
   a device display for displaying information on the portable computerized device;
   a processor;
   a wireless communication module; and
   a non-transitory computer readable medium comprising computer executable instructions, the computer executable instructions configured to cause the processor to perform operations comprising:
   determining, based on a distance between a location of the portable computerized device and an aircraft cockpit of an aircraft, whether the portable computerized device is in a cockpit state such that the portable computerized device is within or docked to the aircraft cockpit of the aircraft, or if the portable computerized device is in a remote state such that the portable computerized device is not in the aircraft and is not docked to the aircraft cockpit;
   wherein, if the portable computerized device is in the remote state, operating in a remote mode and executing a remote mode application that provides a remote mode graphical user interface (GUI) comprising pre-flight navigation planning information; and
   wherein, if the portable computerized device is in the cockpit state, operating in a local mode and executing a local mode application that provides a local mode GUI comprising at least one control for the aircraft.

2. The device of claim 1, the operations further comprising:
   responsive to determining that the portable computerized device is in the remote state, wirelessly communicating with an aircraft computer of the aircraft via a remote network;
   determining that the portable computerized device is at a predetermined location within the aircraft cockpit;
   responsive to determining that the portable computerized device is within the predetermined distance, establishing direct wireless communication with the aircraft computer; and
   operating in the local mode and wirelessly communicating with the aircraft computer of the aircraft via the direct wireless communication.

3. The device of claim 2, wherein in the remote mode, the operations include communicating with the aircraft indirectly through ground-based or satellite-based communication devices.

4. The device of claim 3, wherein the portable computerized device is configured to directly locally communicate with the aircraft computer in the local mode to act as a proxy controller of the aircraft.

5. The device of claim 4, wherein, in the local mode, information from the portable computerized device can be displayed on a primary display in the aircraft cockpit of the aircraft and vice-versa.

6. The device of claim 5, wherein in the local mode, the portable computerized device is docked to a device mount in the aircraft cockpit.

7. The device of claim 6, wherein, in the local mode, the device locally communicates with the aircraft computer via a hard wire connection.

8. The device of claim 7, wherein, in the local mode, the portable computerized device is positioned in a heads-up position in the aircraft cockpit.

9. The device of claim 1, wherein the remote mode GUI and the local mode GUI are different in at least one function.

10. The device of claim 1, wherein the portable computerized device is configured to remotely communicate with an aircraft computer, different from the portable computerize device, to exclusively control at least one system of the aircraft in the remote mode.

11. The portable computerized device of claim 1, the operations further comprising:
   determining the location of the portable computerized device via a satellite system.

12. A non-transitory computer readable medium comprising computer executable instructions, the computer executable instructions, when executed by a processor, cause the processor of a portable computerized device to perform a method, the method comprising:
   determining, based on a distance between a location of the portable computerized device and an aircraft cockpit of an aircraft, whether the portable computerized device is in a cockpit state such that the portable computerized device is within or docked to an aircraft cockpit of an aircraft, or if the portable computerized device is in a remote state such that the portable computerized device is not in the aircraft and is not docked to the aircraft cockpit;
   wherein, if the portable computerized device is in the remote state, operating in a remote mode and executing a remote mode application that provides a remote mode graphical user interface (GUI) comprising pre-flight navigation planning information; and
   wherein, if the portable computerized device is in the cockpit state, operating in a local mode and executing a local mode application that provides a local mode GUI comprising at least one control for the aircraft.

13. The non-transitory computer readable medium of claim 12, wherein the method includes:
   responsive to determining that the portable computerized device is in the remote state, wirelessly communicating with an aircraft computer of the aircraft via a remote network;
   determining that the portable computerized device is at a predetermined location that is within the aircraft cockpit;
   responsive to determining that the portable computerized device is within the predetermined distance, establishing direct wireless communication with the aircraft computer; and
   operating in the local mode and wirelessly communicating with the aircraft computer of the aircraft via the direct wireless communication.

14. The non-transitory computer readable medium of claim 13, wherein in the remote mode, the method includes communicating with the aircraft indirectly through ground-based or satellite-based communication devices.

15. The non-transitory computer readable medium of claim 12, wherein the remote mode GUI and the local mode GUI are different in at least one function.

16. The non-transitory computer readable medium of claim 12, wherein the method includes remotely communicating with an aircraft computer to exclusively control at least one system of the aircraft in the remote mode.

17. The non-transitory computer readable medium of claim 16, wherein the method includes directly locally communicating with the aircraft computer in the local mode to act as a proxy controller of the aircraft.

18. The non-transitory computer readable medium of claim 12, wherein the method includes determining the location of the portable computerized device via a satellite system.

* * * * *